(No Model.)
F. E. LACK.
WHIFFLETREE HOOK.
No. 602,136. Patented Apr. 12, 1898.
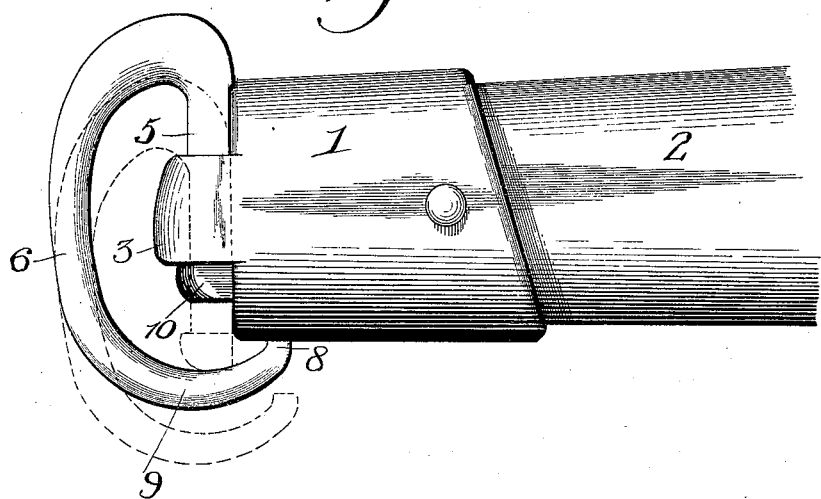
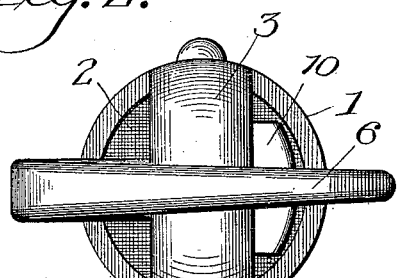
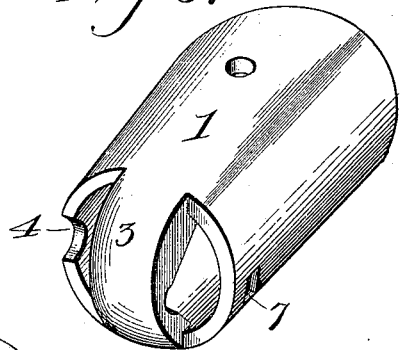
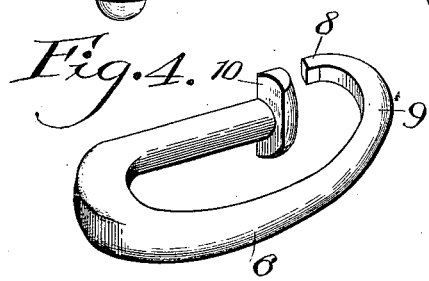
Witnesses
A. Roy Appleman
V. B. Hillyard
Inventor
Finis E. Lack.
By his Attorneys,
C. A. Snow & Co.

UNITED STATES PATENT OFFICE.

FINIS EWING LACK, OF PADUCAH, KENTUCKY.

WHIFFLETREE-HOOK.

SPECIFICATION forming part of Letters Patent No. 602,136, dated April 12, 1898.

Application filed August 31, 1897. Serial No. 650,164. (No model.)

*To all whom it may concern:*

Be it known that I, FINIS EWING LACK, a citizen of the United States, residing at Paducah, in the county of McCracken and State of Kentucky, have invented a new and useful Whiffletree-Hook, of which the following is a specification.

This invention relates to means for coupling a trace or tug to the extremity of a whiffletree, and has for its object the provision of a fastener which will admit of the coupling and uncoupling of the trace being easily effected and which will prevent its accidental disengagement when in position, the hook obtaining a bearing at both ends upon the ferrule, which latter closes the space through which the cockeye passes and the parts being so constructed as to guard against a spreading of the hook when subjected to abnormal strain.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of an end portion of a whiffletree, showing the improved fastening in position, the dotted lines showing the position of the hook when moved rearward to admit of the coupling and uncoupling of the trace or tug. Fig. 2 is an end view thereof. Fig. 3 is a detail view in perspective of the ferrule. Fig. 4 is a detail view in perspective of the hook.

Corresponding and like parts are referred to in the following description and indicated in the severals views of the drawings by the same reference characters.

The ferrule 1 is applied to an end of the whiffletree 2 and is secured thereto in any of the usual ways and is provided at its outer end with a cross-bar 3, outwardly deflected or arched between its ends. A notch 4 is formed in the outer end of the ferrule in front of the cross-bar 3 and receives the shank 5 of the hook 6 and also provides clearance for the hook when manipulating it for removal or placing in position. A depression 7 is formed in the rear side of the ferrule a short distance from its outer end and receives the bent extremity 8 of the hook 6. The ferrule and crossbar are integrally formed.

The hook has a straight shank 5, and its bill 9 has its outer end portion projecting beyond and over the end of the shank and terminating in the bent portion 8, which is adapted to enter the depression 7. A cross-head 10 is provided at the free end of the shank 5 and overlaps and engages with the rear side of the cross-bar 3, and between this crosshead and bent end 8 is formed a passage for the ingress and egress of the cockeye applied to the end of the trace or tug.

The hook constructed as set forth herein engages positively at its ends with the ferrule, and the latter closes the passage through which the cockeye finds entrance and egress, thereby preventing the accidental displacement of the trace when coupled to the whiffletree in the manner set forth. By having the end portions of the hook engaged positively with the ferrule they are prevented from spreading when the hook is subjected to severe and abnormal strain, which is of advantage in draft-harness.

Having thus described the invention, what is claimed as new is—

1. In means for securing a trace or tug to a whiffletree or the like, the combination of a ferrule having a cross-bar at its outer end, and a hook having its shank slidably mounted in the space formed between the said cross-bar and terminal of the ferrule and having its extremity headed to engage with the rear side of the cross-bar and limit the forward movement of the hook, and having its bill portion extending beyond the said cross-bar and curving in the rear of the headed end of the shank and engaging with the rear side of the ferrule, substantially as shown for the purpose specified.

2. In means for securing a trace or tug to a whiffletree or the like, the combination of a ferrule provided at its outer end with the cross-bar, and a hook having its shank portion slidably mounted in the space formed between the cross-bar and outer end of the ferrule and headed to engage with the rear side of the cross-bar, and having its bill portion exterior to the cross-bar and curving around it and the headed end of the shank and having the extremity of the bill bent and adapted to enter a depression in the rear side of the ferrule so as to make positive engagement therewith, substantially as set forth.

3. In combination, a ferrule having a cross-bar at its outer end midway between its front and rear sides and having a depression in its rear side a short distance from its outer end and having a notch forward of the cross-bar, and a hook having its shank portion slidably mounted in the space formed between the cross-bar and outer end of the ferrule and having its inner end headed to engage with the rear side of the cross-bar and its front end normally fitted in the said notch, and having its bill curving around the cross-bar and the headed end of the shank and bent to make positive engagement with the recess in the rear side of the ferrule, substantially as and for the purpose specified.

In testimony that I claim the foregoing as my own I have hereto affixed my signature in the presence of two witnesses.

FINIS EWING LACK.

Witnesses:
   E. J. PAXTON,
   R. RUDY.